(12) United States Patent  
Alarcon et al.

(10) Patent No.: US 9,045,202 B1  
(45) Date of Patent: Jun. 2, 2015

(54) APPARATUS AND SYSTEM FOR DETECTING AND SHARING CHARACTERISTICS OF A RIDE ON A WATERCRAFT

(71) Applicant: Data Fin Corporation, New York, NY (US)

(72) Inventors: Mauricio Alarcon, Brooklyn, NY (US); Nick Jonas, New York, NY (US); Paul Aaron, New York, NY (US)

(73) Assignee: Data Fin Corporation, New York, NY (US)

( * ) Notice: Subject to any disclaimer, the term of this patent is extended or adjusted under 35 U.S.C. 154(b) by 0 days.

(21) Appl. No.: 14/266,794

(22) Filed: Apr. 30, 2014

(51) Int. Cl.
  *B63B 35/00* (2006.01)
  *B63B 35/79* (2006.01)
  *G01C 21/20* (2006.01)

(52) U.S. Cl.
  CPC ............ *B63B 35/7926* (2013.01); *G01C 21/20* (2013.01)

(58) Field of Classification Search
  USPC ....................................... 441/74, 79; 114/274
  IPC ....................................... B63B 35/793,35/7926
  See application file for complete search history.

(56) References Cited

U.S. PATENT DOCUMENTS

| | | | |
|---|---|---|---|
| 3,238,911 A | 3/1966 | Lucian et al. | |
| 4,325,154 A * | 4/1982 | Collum, Jr. ..................... | 441/74 |
| 4,535,626 A | 8/1985 | Wakayama | |
| 4,586,374 A | 5/1986 | SaynjaKangas | |
| 4,653,320 A | 3/1987 | Laforge et al. | |
| 4,955,835 A | 9/1990 | Hollingsworth | |
| 5,791,280 A * | 8/1998 | Egan et al. ..................... | 114/361 |
| 5,975,974 A | 11/1999 | Mccausland | |
| 6,106,346 A | 8/2000 | Bolen | |
| 6,192,821 B1 * | 2/2001 | Morales et al. ............... | 114/343 |
| 6,539,336 B1 | 3/2003 | Vock et al. | |
| 6,885,971 B2 | 4/2005 | Vock et al. | |
| 6,959,259 B2 | 10/2005 | Vock et al. | |

(Continued)

FOREIGN PATENT DOCUMENTS

EP  0095040 A  11/1983

OTHER PUBLICATIONS

ActiveReplay "Trace" https://www.kickstarter.com/projects/activereplay/trace-the-most-advanced-activity-monitor-for-actio, viewed Apr. 28, 2014.

(Continued)

*Primary Examiner* — Stephen Avila  
(74) *Attorney, Agent, or Firm* — Hudak Consulting Group LLC

(57) ABSTRACT

Described herein are systems and apparatuses for detecting and sharing characteristics of a ride on a watercraft. In general, a watercraft apparatus may include at least one fin coupleable to a bottom portion of a planar body. In a preferred embodiment, the fin may define a fully enclosed cavity configured to receive a ride tracking device. In general, a watercraft system may optionally include a planar body configured for moving across a water surface and for carrying a rider. In general, a watercraft apparatus may include at least one fin coupled or coupleable to a bottom portion of the planar body. In a preferred embodiment, the fin may define a fully enclosed cavity, and a ride tracking device may be disposed within the cavity.

18 Claims, 6 Drawing Sheets

(56) References Cited

U.S. PATENT DOCUMENTS

| | | |
|---|---|---|
| 6,966,808 B1 | 11/2005 | Liao |
| 7,162,392 B2 | 1/2007 | Vock et al. |
| 7,166,005 B2 | 1/2007 | Tirloni et al. |
| 7,433,805 B2 | 10/2008 | Vock et al. |
| 7,860,666 B2 | 12/2010 | Vock et al. |
| 7,966,154 B2 | 6/2011 | Vock et al. |
| 7,991,565 B2 | 8/2011 | Vock et al. |
| 8,130,096 B2 * | 3/2012 | Monte et al. ............. 340/539.13 |
| 8,217,788 B2 | 7/2012 | Vock et al. |
| 8,239,146 B2 | 8/2012 | Vock et al. |
| 8,249,831 B2 | 8/2012 | Vock et al. |
| 8,396,687 B2 | 3/2013 | Vock et al. |
| 8,600,699 B2 | 12/2013 | Vock et al. |
| 8,620,600 B2 | 12/2013 | Vock et al. |
| 2009/0042467 A1 | 2/2009 | Huang |
| 2013/0128022 A1 | 5/2013 | Bose et al. |
| 2014/0072278 A1 | 3/2014 | Kramer et al. |

OTHER PUBLICATIONS

Core Coders, Ltd. "Ski Tracks"https://itunes.apple.com/us/app/ski-tracks-gps-track-recorder/id365724094?mt=8, viewed Apr. 28, 2014.

Design I/O LLC "Strataviz"http://www.design-io.com/projects/Skataviz/, viewed Apr. 28, 2014.

Garmin "Connect powered by Garmin" http://connect.garmin.com/en-US/features, viewed Apr. 28, 2014.

Gopro "Hero3+" http://gopro.com/cameras, viewed Apr. 28, 2014.

Rideware Labs "Dashboard"http://ridewarelabs.com/2013/01/30/the-rideware-labs-dashboard/, viewed Apr. 28, 2014.

Rideware Labs "Yellowbird"http://ridewarelabs.com/2012/03/12/105/, viewed Apr. 28, 2014.

Rideware LABShttp://ridewarelabs.com/2012/10/15/new-generative-sketches/, viewed Apr. 28, 2014.

SAILRACER.NEThttp://www.sailracer.net/device/gps.php, viewed Apr. 28, 2014.

* cited by examiner

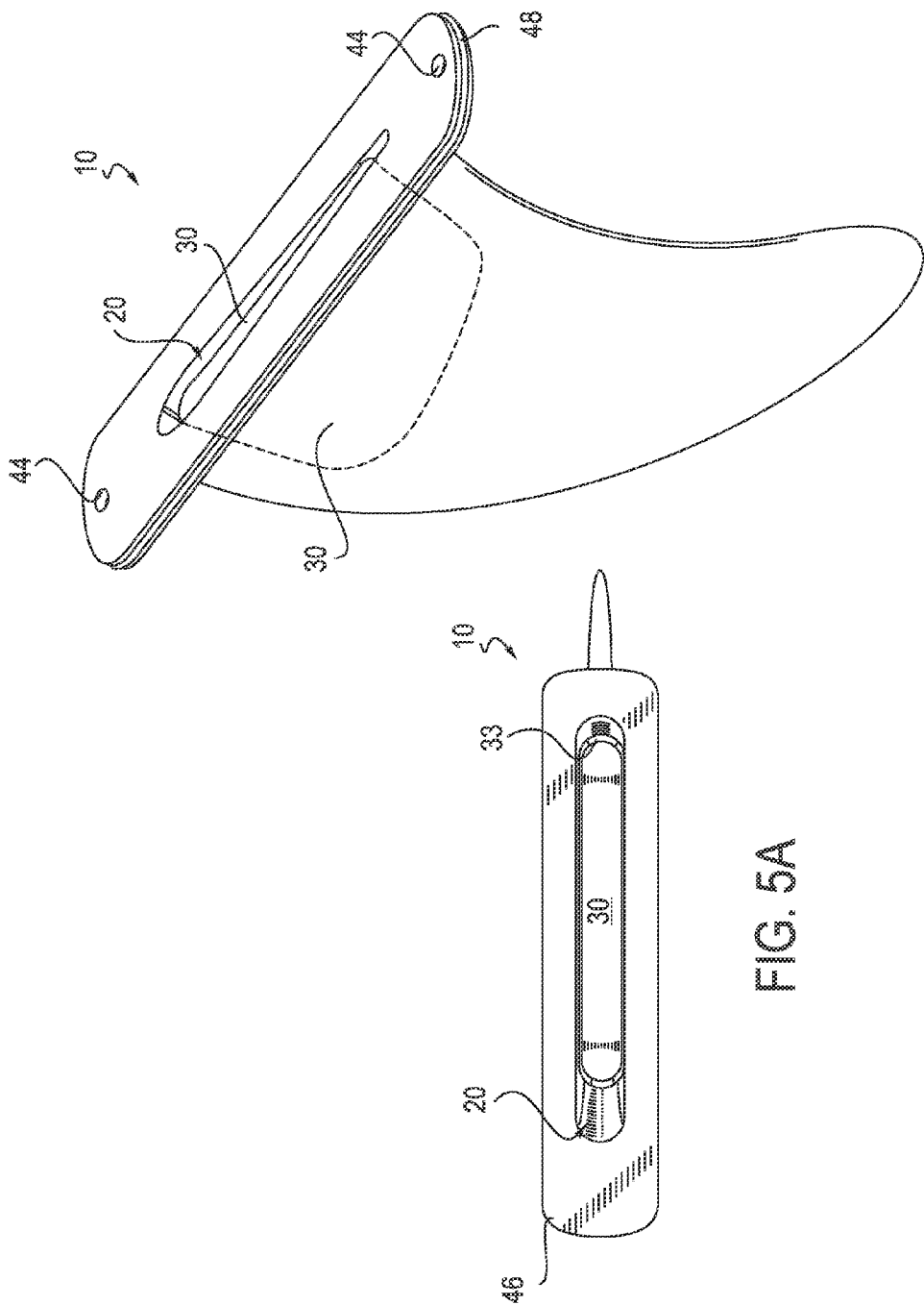

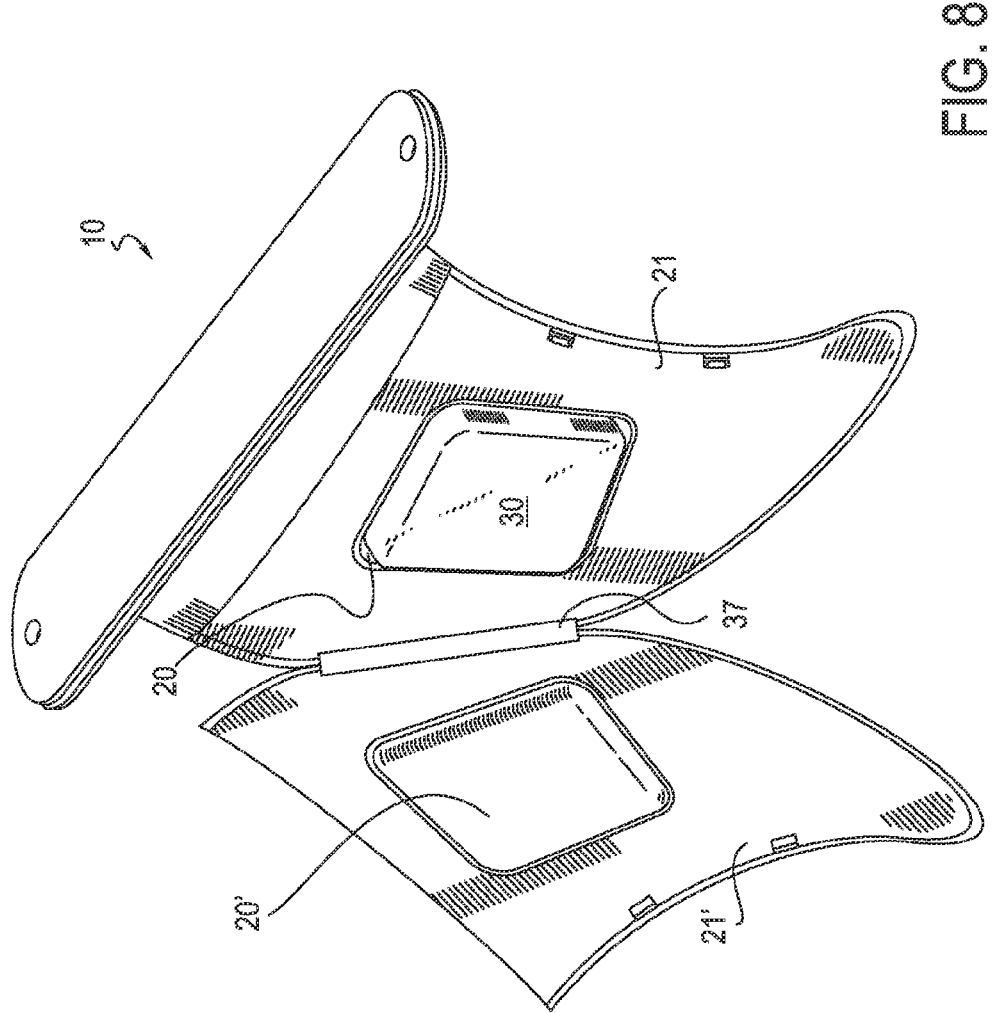

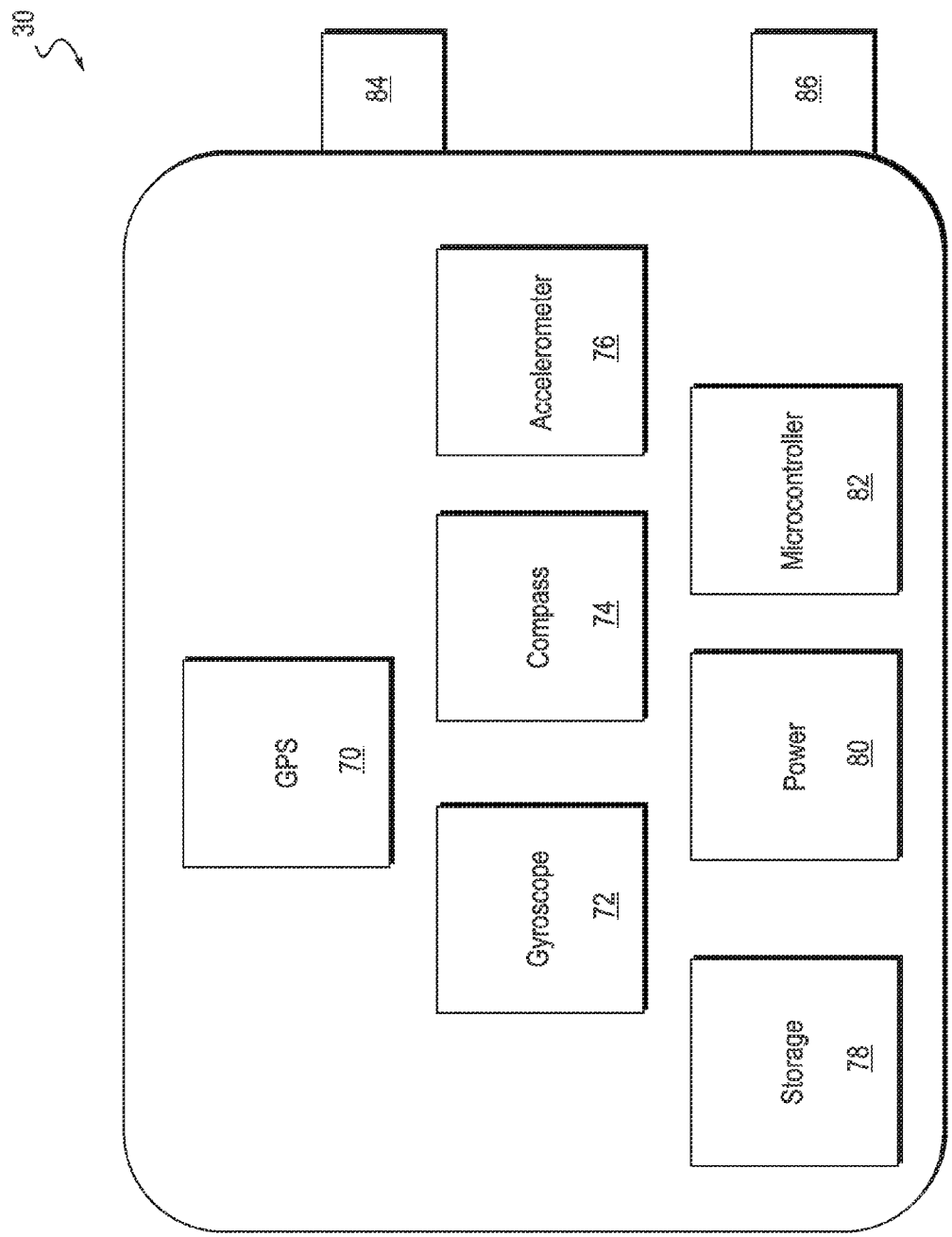

APPARATUS AND SYSTEM FOR DETECTING AND SHARING CHARACTERISTICS OF A RIDE ON A WATERCRAFT

TECHNICAL FIELD

This invention relates generally to surface water sports, and more specifically to an improved and useful apparatus and system for detecting and sharing characteristics of a ride on a watercraft.

BACKGROUND

Surface water sports are sports in which the activity is performed on top of a body of water. Surface water sports can include such activities as sailing, boating, wakeboarding, tubing, water skiing, bodyboarding, kite surfing, windsurfing, paddleboarding, and surfing. Surfing is a surface water sport in which the rider, termed a surfer, rides on the forward or deep face of a moving wave. Typically, surfers use a watercraft, termed a surfboard, to ride a moving wave. The surfboard maintains maneuverability on the surface of the water by being lightweight and having minimum friction between the surfboard and the water. Further, for the surfer to successfully execute a ride on the surfboard, the surfer must possess great skill, precision, and balance.

A surfer may be better equipped to execute a ride on a wave if the surfer could study characteristics of his/her ride on a wave. It may be desirable to measure a surfboard's velocity, distance, altitude, rotation, orientation, movement, and location during a ride on a wave. However, carrying all of the electrical devices required for these measurements on a surfer or surfboard may be cumbersome, potentially reducing the balance and precision of the surfer and the lightweight and water-gliding characteristics of the surfboard.

Thus, there is a need for an improved and useful apparatus and system for detecting and sharing characteristics of a ride on a watercraft. This invention provides such an improved and useful apparatus and system.

SUMMARY

Described herein are apparatuses and systems for detecting and sharing characteristics of a ride on a watercraft. In general, a watercraft system may optionally include a planar body configured for moving across a water surface and for carrying a rider. In general, a watercraft system may include at least one fin coupled to a bottom portion of a planar body. In general, the fin may define a fully enclosed cavity. In general, a watercraft system may include a ride tracking device disposed within the cavity.

In some embodiments, the planar body may be a surfboard. In some embodiments, the fully enclosed cavity defined by the fin may be watertight. In some embodiments, the fully enclosed cavity defined by the fin may be accessed by a rider. In some embodiments, the ride tracking device may be watertight or waterproof. In some embodiments, the ride tracking device may be configured to collect data about a ride on the planar body. In some embodiments, the ride tracking device is configured to collect data comprising at least one of duration of a ride, velocity, movement, and location. In some embodiments, the ride tracking device may include a gyroscope, accelerometer, compass, global positioning device (GPS), and/or device including a combination thereof. In some embodiments, the data collected by the ride tracking device may be wirelessly transmitted to another location. In some embodiments, the ride tracking device may include a power cable port and/or data transfer cable port. In some embodiments, the ride tracking device may include a storage device, such that the data are stored in the fin on the storage device. In some embodiments, the storage device may be a removable storage or mounted storage device. In some embodiments, the ride tracking device may be powered by hydroelectricity. In some embodiments, the data collected by the ride tracking device may be transformed into an artistic representation of the ride. In some embodiments, the artistic representation may be a visual and/or audible representation of the ride. In some embodiments, an internal surface of the fully enclosed cavity may be shaped to hold the ride tracking device. In some embodiments, the fin may include two fin halves configured to couple to one another to form the fin. In some embodiments, each fin half may include a recessed portion such that when the fin halves are coupled together, the fin halves define the cavity. In some embodiments, the fin may include a base with a slot configured for receiving the ride tracking device. In some embodiments, the cavity may become watertight by coupling the base of the fin to the bottom portion of the planar body.

In general a watercraft apparatus may include at least one fin coupleable to a bottom portion of a planar body. In general, the fin may define a fully enclosed cavity configured to receive a ride tracking device.

In some embodiments, the planar body may be a surfboard. In some embodiments, the fully enclosed cavity defined by the fin may be watertight. In some embodiments, the fully enclosed cavity defined by the fin may be accessed by a rider. In some embodiments, the ride tracking device may be watertight or waterproof. In some embodiments, the ride tracking device may be configured to collect data about a ride on the watercraft. In some embodiments, the ride tracking device is configured to collect data comprising at least one of duration of a ride, velocity, and movement. In some embodiments, the ride tracking device may include a gyroscope, accelerometer, compass, global positioning device (GPS), and/or device including a combination thereof. In some embodiments, the data collected by the ride tracking device may be transmitted wirelessly to another location. In some embodiments, the ride tracking device may include a power cable port and/or data transfer cable port. In some embodiments, the ride tracking device may include a storage device, such that the data are stored in the fin on the storage device. In some embodiments, the storage device may be a removable storage or mounted storage device. In some embodiments, the ride tracking device may be powered by hydroelectricity. In some embodiments, the data may be transformed into an artistic visual representation of the ride. In some embodiments, the artistic representation may be a visual and/or audible representation of the ride. In some embodiments, an internal surface of the fully enclosed cavity may be shaped to hold the ride tracking device. In some embodiments, the fin may include a base with a slot configured for receiving the ride tracking device. In some embodiments, the cavity may become watertight by coupling the base of the fin to the bottom portion of the planar body. In some embodiments, the fin may include two fin halves configured to couple to one another to form the fin. In some embodiments, each fin half may include a recessed portion such that when the fin halves are coupled together, the fin halves define the cavity.

BRIEF DESCRIPTION OF THE DRAWINGS

FIGS. 5A and 5B illustrate a bottom view and side view, respectively, of a fin in accordance with a third embodiment;

FIG. 8 illustrates a fin defining a fully enclosed cavity in accordance with a sixth embodiment; and FIG. 9 illustrates a ride tracking device in a fully enclosed cavity defined by a fin in accordance with a preferred embodiment.

DETAILED DESCRIPTION

The following description of the preferred embodiments of the invention is not intended to limit the invention to these preferred embodiments, but rather to enable any person skilled in the art to make and use this invention. Disclosed herein are an apparatus and system for detecting and sharing characteristics of a ride on a watercraft.

In some embodiments, a watercraft system may include a planar body and at least one fin coupled to a bottom portion of the planar body. The planar body is configured for moving across a water surface and for carrying a rider. In some embodiments, a fin may define a fully enclosed cavity. In some embodiments, the fin may further include a ride tracking device enclosed within the cavity.

In some embodiments of the present invention, a planar body configured for moving across a water surface and for carrying a rider may be a watercraft, for example a surfboard. In general, watercrafts may be motorized, wind-powered, human-powered, or unpowered. In general, motorized watercrafts include boats, jet skis, water skis (coupled to boats), and water tubes (coupled to boats). In general, wind-powered watercrafts include sailboats, sailboards, and kiteboards. In general, human-powered watercrafts include paddleboats, canoes, kayaks, and paddleboards. In general, unpowered watercrafts include wakeboards and surfboards, such that the movement of water underneath the watercraft propels the watercraft.

In general, a watercraft may further include at least one apparatus coupled or coupleable to the watercraft. In some embodiments of the present invention, a watercraft, for example a surfboard, may include a coupled or coupleable fin for stabilizing and/or balancing the watercraft. In general, alternative apparatuses may be used to move the watercraft, improve maneuverability and/or stability of the watercraft, and/or maintain a rider on or coupled to the watercraft. In general, apparatuses may include one or more motors for inducing movement of the watercraft, one or more propellers for moving the watercraft, a mast carrying sails, and/or a leash for coupling a rider to the watercraft.

Figure 1:
FIG. 1 illustrates a fin coupled to a watercraft in accordance with a preferred embodiment.

In some embodiments, as shown in FIG. 1, a watercraft apparatus may include at least one fin 10 coupleable to a bottom portion of a surfboard 1. A fin may be used to improve directional stability and control through foot steering by a rider. A fin may provide lateral lift opposed to the water and stabilize the watercraft's trajectory. A fin may allow a rider to control direction and orientation of the watercraft by varying his/her weight distribution on the watercraft. In some embodiments, a fin 10 may be adapted to house a ride tracking device to collect data about characteristics of a ride on the surfboard. In some embodiments, a surfboard 1 and a fin 10 may be used, received, purchased, or otherwise acquired as a system. For example, a fin may be fixedly coupled to a surfboard, such that the fin and surfboard are inseparable. In some embodiments, a fin may be permanently coupled to a surfboard through a material such as fiberglass. In some embodiments, a fin 10 coupleable to a surfboard 1 may be used, received, purchased, or otherwise acquired as a separate apparatus. For example, a fin may be removably coupled to a surfboard. For example, the removable fin may be configured to couple and uncouple from a number of different surfboards. Additionally the fin may be used when not coupled to a surfboard. For example, a user may remove the fin from the surfboard to interact with the ride tracking device within the fin as described below. In some embodiments, more than one fin may be coupled or coupleable to a bottom portion of a watercraft.

Figure 3:
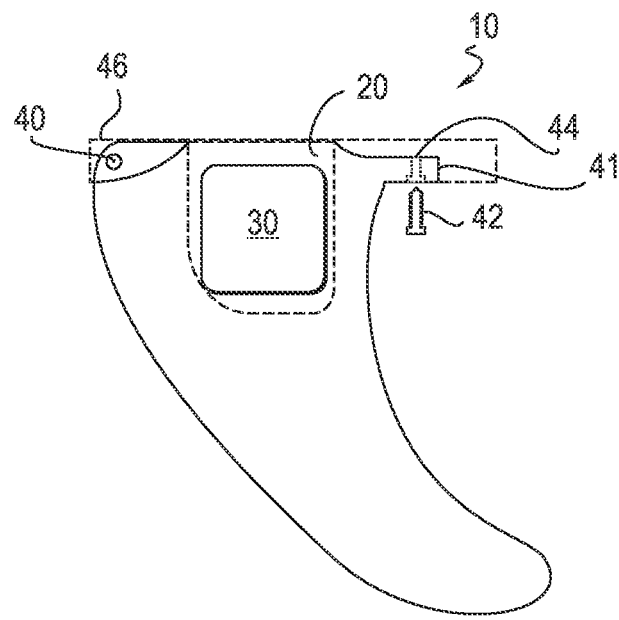
FIG. 3 illustrates a fully enclosed cavity defined by a fin in accordance with a preferred embodiment.
Figure 4:
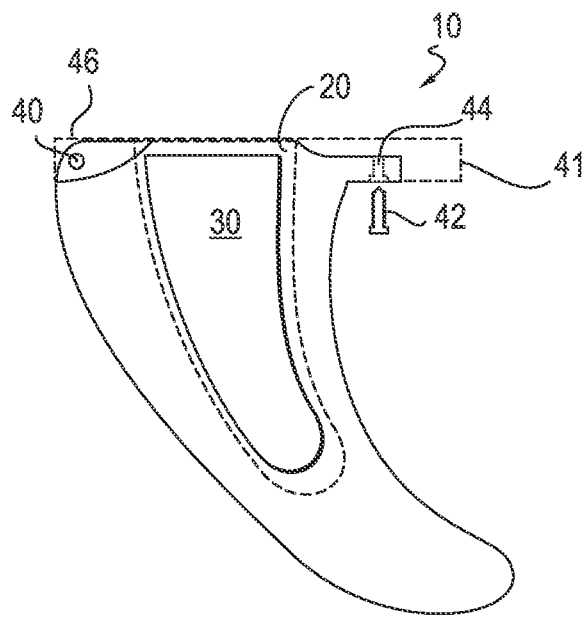
FIG. 4 illustrates a fully enclosed cavity defined by a fin in accordance with an alternative embodiment.

As shown in FIGS. 3-4, a fin 10 may include adapters 40, 44 on the base 46 of the fin 10 for coupling the fin 10 to a bottom surface of a planar body, such as a surfboard. In some embodiments, coupling a fin to a surfboard may include a snap-fit connection or screw connection. In some embodiments, the surfboard may include one or more female adapters for receiving one or more male adapters on the fin, or vice versa. In some embodiments, the fin may include one or more helical screws configured to thread into female adapters on a surfboard. In some embodiments, as shown in FIGS. 3-4, one or more grub screws 42 may be inserted into a shaft 44 in the base 46 of the fin 10 to further secure the fin 10 to the surfboard. In some embodiments, as shown in FIG. 3, a dowel pin on a bottom portion of a surfboard may mate with an eyelet 40 in the base 46 of the fin 10 for hingedly connecting the fin 10 to the surfboard.

In general, a fin may be shaped to improve directional stability and control through foot steering by a rider. A fin may be shaped to provide lateral lift opposed to the water and to stabilize the watercraft's trajectory. A fin may be shaped to allow a rider to control direction and orientation of the watercraft by varying his/her weight distribution on the watercraft. In general, a fin may include an exterior surface and an interior surface. In general, the exterior surface of a fin may include two edges and two surfaces.

Figure 2:
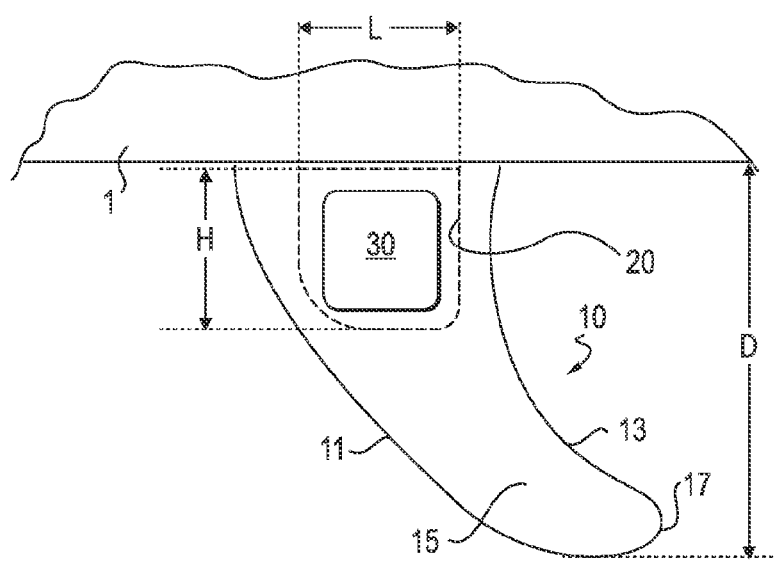
FIG. 2 illustrates a fully enclosed cavity defined by a fin coupled to a surfboard in accordance with a preferred embodiment.

In some embodiments, as shown in FIG. 2, a fin 10 may include one convex edge 11 opposite one concave edge 13, such that the two edges merge to form a rounded apex 17. In some embodiments, as shown in FIG. 2, a fin 10 may include two substantially flat surfaces 15 coupled together by the concave edge 13 on one side and the convex edge 11 on the opposite side. In some embodiments, the fin 10 may have a depth D, such that the degree of curvature of the concave edge 13 determines the depth D. Further, in some embodiments, the fin 10 may further include a base 46, as shown in FIGS. 3-4. In some embodiments, as shown in FIGS. 3-4, a slot on a bottom portion of a surfboard may slidably receive a portion of the base 46 including a protrusion 41, such that the base 46 including the protrusion 41 couples the fin 10 to the surfboard. Alternatively, in some embodiments, the base 46 may include adapters 40, 44 for coupling the fin 10 to a surfboard, as described above.

In some embodiments, as show in FIGS. 2-7, the fin 10 may include a cavity 20 in the interior of the fin 10 such that the cavity 20 is defined by and fully enclosed within the fin 10. In some embodiments, the interior cavity 20 of the fin 10 may be watertight. In some embodiments, the cavity 20 may be watertight to prevent drag on the surfboard caused by water accumulating in the cavity 20. In some embodiments, as shown in FIGS. 2-7, the cavity 20 may be shaped to house a ride tracking device 30 that collects data about characteristics of a ride on the watercraft. In some embodiments, the ride tracking device 30 may be used to measure a duration or time of day of a ride or a surfboard's velocity, distance, altitude, rotation, orientation, movement, and location during a ride on a wave. In some embodiments, the cavity 20 may be watertight such that the ride tracking device 30 is not short-circuited by water infiltrating into the cavity 20. Alternatively, in some embodiments, the ride tracking device may be waterproof and/or watertight, such that the cavity 20 is not required to be watertight.

Figure 6:
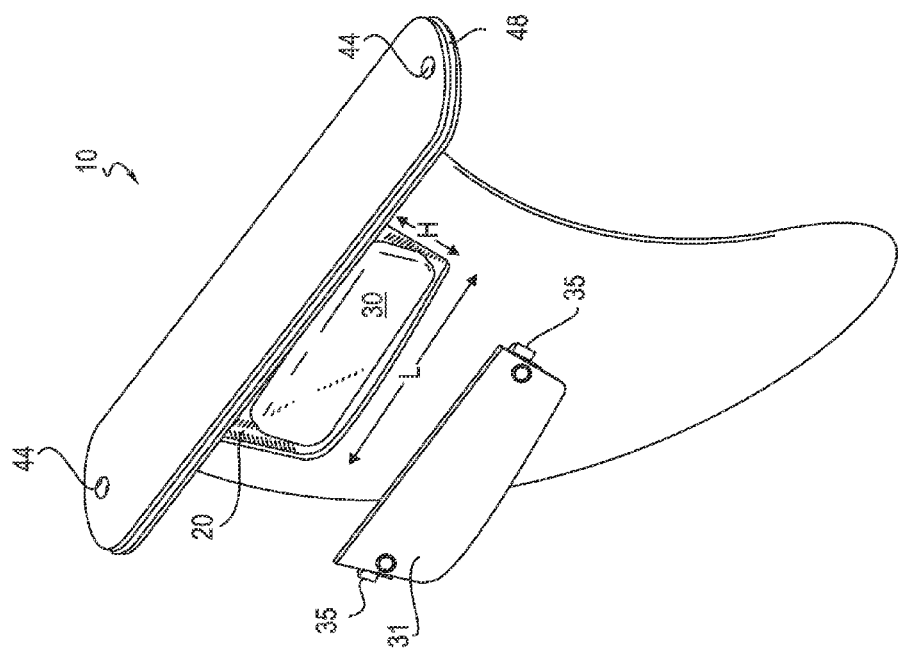
FIG. 6 illustrates a side view of a fin defining a fully enclosed cavity in accordance with a fourth embodiment.

In general, the cavity 20 may any size or shape suitable to receive and house a ride tracking device 30 configured to collect, interpret, and record data during a ride on a watercraft. In some embodiments, the internal surface of the cavity 20 may be shaped to receive the ride tracking device 30. In some embodiments, the cavity 20 may comprise opposing concave grooves shaped to hold the ride tracking device 30. In some embodiments, as shown in FIG. 2, the cavity 20 may be in the shape of a cube, such that the height H is equal to the length L. In some embodiments, as shown in FIG. 6, the cavity 20 may be in the shape of a rectangular prism, such that the height H is less than the length L. Alternatively, in some embodiments, the cavity 20 may be in the shape of a prism, cylinder, cone, sphere, or tetrahedron. In some embodiments, the cavity 20 may have an irregular shape, as shown in FIG. 5B. In some embodiments, as shown in FIG. 4, the cavity 20 may be in a similar shape as the fin, as described above. In some embodiments, the cavity 20 may have a volume equal to the volume enclosed by the fin 10. In some embodiments, the cavity 20 may occupy a lesser volume than the total volume enclosed by the fin 10. In some embodiments, the cavity 20 may be positioned near the base 46 of the fin 10, as shown in FIG. 3. In some embodiments, the cavity 20 may be positioned in any location in the fin 10.

Figure 7:
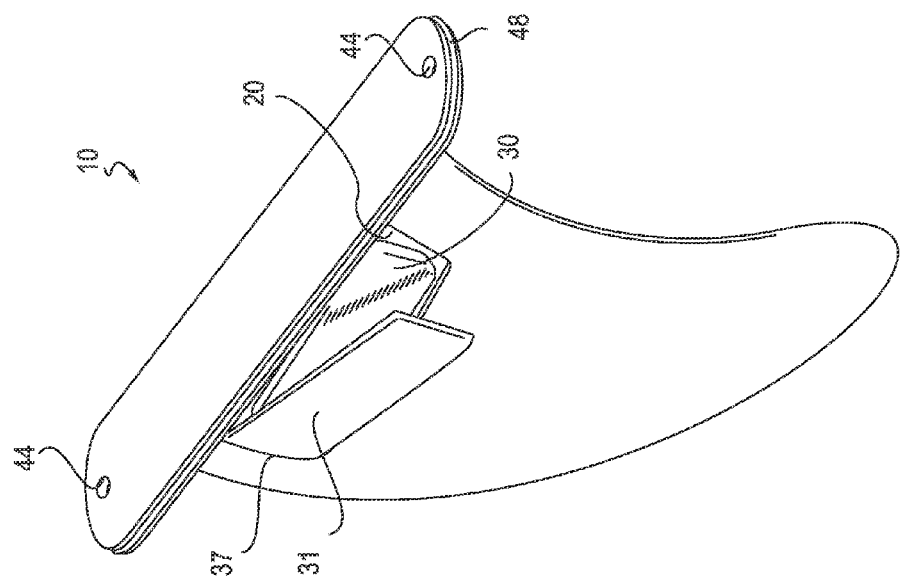
FIG. 7 illustrates a side view of a fin defining a fully enclosed cavity in accordance with a fifth embodiment.

In some embodiments, the cavity 20 may be accessible, such that the ride tracking device 30 or components of the ride tracking device may be removed, replaced, or added. In some embodiments, as shown in FIGS. 5A and 5B, the base 46 of the fin 10 may include a slot 33 for receiving the ride tracking device 30. In some embodiments, as shown in FIG. 5B, the perimeter of base 46 includes a watertight seal 48 and eyelets 44 configured for receiving fasteners for coupling the fin 10 to a surfboard. As shown in FIG. 5B, the seal 48 between the base 46 of the fin 10 and the surfboard creates the cavity 20 defined by the fin 10. In some embodiments, the seal creates a watertight cavity. In some embodiments as shown in FIG. 6, the fin 10 may include a hatch 31 coupleable to the fin 10 and configured for sealing the cavity 20 defined by the fin 10. In some embodiments, as shown in FIG. 6, the hatch 31 is coupleable to the fin 10 through latches 35. Alternatively, in some embodiments, as shown in FIG. 7, the hatch 31 is coupleable to the fin 10 through a hinge 37. In some embodiments, the hatch 31 may be coupleable to the fin 10 through any fastening or attachment mechanism. In some embodiments, the concave or convex edge of the fin may include a hinge, such that the opposite side may be opened and the interior cavity 20 of the fin 10 splayed open for access.

In some embodiments, as shown in FIGS. 2-4, the ride tracking device 30 may be embedded and/or encapsulated in the interior of the fin 10 by molding, melting, and/or bonding the fin around the ride tracking device 30. In some embodiments, as shown in FIG. 8, the fin 10 may comprise two fin halves 21, 21', such that the two halves 21, 21' snap together to form the cavity 20. In some embodiments, each half of the fin 10 may include a recessed portion 20, 20' such that when the two halves 21, 21' are coupled to one another, the two opposing recesses 20, 20' define an internal cavity 20. In some embodiments, the two halves 21, 21' may be pressed, glued, welded, ultrasonically welded, or otherwise connected together around a ride tracking device 30. In some embodiments, each half of the fin 10 may be configured to receive a portion of a screw such that the two halves 21, 21' may be coupled by at least one screw or threaded coupling device. In some embodiments, the two halves 21, 21' of the fin 10 may be configured to be removably coupled such that a user may access the cavity 20. Alternatively, the cavity 20 and ride tracking device 30 may be substantially inaccessible. In some embodiments, a pin joint or hinge 37 may join the two halves 21, 21', such that the two halves 21, 21' rotate around the hinge 37 and are aligned to form the watertight cavity 20.

In some embodiments, as shown in FIGS. 2-4 and 8, the ride tracking device may be inaccessible to a user and/or rider. In some embodiments, the ride tracking device may be substantially inaccessible such that the ride tracking device could be accessed by disassembling the fin or by otherwise accessing the cavity. In some embodiments, data collected by the ride tracking device 30 may be transmitted wirelessly to another location, without requiring direct access to the cavity. In some embodiments, the ride tracking device may be recharged while remaining in the cavity, without requiring direct access to the cavity. In some embodiments, the ride tracking device is recharged by coupling the fin to an external power source, such that the fin and/or the ride tracking device includes a power cable port 84, as shown in FIG. 9. In some embodiments, the ride tracking device is recharged using solar panels on the fin, an inductive charging source, for example a wireless charging pad, or hydroelectricity, for example by attaching a propeller to the fin to generate power for the ride tracking device. In some embodiments, software on the ride tracking device is updated and/or data is transferred from the ride tracking device by coupling the fin to an external computer or other suitable processor without requiring direct access to the cavity. In some embodiments, the fin and/or ride tracking device may include a data transfer cable port 86, as shown in FIG. 9. In some embodiments, the data transfer cable port 86 may be configured for receiving a universal serial bus (USB) cable configured for transferring ride data to an external device, for example a computer. Alternatively, in some embodiments, the data transfer cable port 86 may be configured for receiving an IEEE 1394 Interface, also termed FireWire, configured for transferring ride data to an external device, for example a computer.

As described above, in some embodiments, as shown in FIGS. 2-8, the fully enclosed cavity 20 defined by the fin 10 may be configured to receive a ride tracking device 30. In some embodiments, the ride tracking device 30 may be configured to detect, collect, store, and export data about characteristics of a ride on the watercraft. In some embodiments, the ride tracking device 30 may be used to measure a duration or time of day of a ride or a surfboard's velocity, distance, altitude, rotation, orientation, movement, and location during a ride on a wave. In some embodiments, as shown in FIG. 9, the ride tracking device 30 in the cavity 20 may include a gyroscope 72, accelerometer 76, compass 74, global positioning system (GPS) 70, microcontroller 82, data storage device 78, and power source 80. In some embodiments, the ride tracking device 30 may include one device that performs all or some combination of the functions of a gyroscope, accelerometer, and compass. In some embodiments, the ride tracking device 30 further includes a power cable port 84 and/or a data transfer cable port 86, as described above.

In general, a gyroscope 72 is a physical sensor that detects and measures the angular motion of an object relative to an inertial frame of reference. In general, a gyroscope incorporated into a ride tracking device is a vibrating structure gyroscope manufactured with microelectromechanical systems (MEMS). In general, MEMS-gyroscopes may provide either digital or analog output. In general, MEMS-gyroscopes contain gyroscopic sensors for multiple axes. In general, a gyroscope may be in electrical communication with a microcontroller 82. In general, the signal received by the gyroscope 72 is sent to and interpreted by the microcontroller 82.

In general, an accelerometer 76 is a physical sensor that measures acceleration (or g-force) relative to a free-falling frame of reference. In general, single- and multi-axis accelerometers can measure the magnitude and direction of the acceleration (or g-force). In general, accelerometers are frequently manufactured with MEMS. In general, an accelerometer may be in electrical communication with a microcontroller. In general, the signal received by the accelerometer 76 is sent to and interpreted by the microcontroller 82. In some embodiments, combining a gyroscope 72 and an accelerometer 76 into an apparatus, for example a fin 10, enables motion of the fin 10 to be sensed in six axes or six degrees of freedom (6DOF).

In general, a compass 74 is a navigational instrument that shows directions in a frame of reference that is stationary relative to the surface of the earth. The frame of reference defines the four cardinal directions of north, south, east, and west. In general, compasses in electronic devices are solid-state compasses that include two or three magnetic field sensors. In general, the compass outputs either a digital or analog signal proportional to its orientation. In general, a compass 74 may be in electrical communication with a microcontroller 82. In general, the signal output from the compass 74 is received and interpreted by the microcontroller 82. In some embodiments, combining a gyroscope 72, accelerometer 76, and compass 74 into an apparatus, for example a fin 10, enables motion of the fin 10 to be sensed in nine axes. In general, sensors that can measure motion in nine axes are termed nine degrees of freedom or 9DOF sensors.

In some embodiments, 9DOF sensors from InvenSense®, Bosch Sensortec GmbH®, Texas Instruments Incorporated®, or Movea® may be used in the ride tracking device 30 in the cavity 20 defined by the fin 20. Alternatively, in some embodiments, custom 9DOF sensors may be incorporated into the ride tracking device 30 in the cavity 20 defined by the fin 10.

In general, a GPS 70 is a satellite-based navigation system that provides location and time information in all weather conditions on Earth where there is an unobstructed line of sight from a number of GPS satellites. In general, a GPS 70 may be in electrical communication with a microcontroller 82. In general, the signal output from the GPS 70 is received and interpreted by the microcontroller 82. In some embodiments, the GPS 70 in the ride tracking device 30 in the fin 10 may identify a location of the fin and thus a surfer. In some embodiments, a GPS 70 from Adafruit®, Polar Electro®, Garmin®, or Dexter Industries® may be used in the ride tracking device 30 in the cavity 20 defined by the fin 10. Alternatively, in some embodiments, a custom GPS 70 may be incorporated into the ride tracking device 30 in the cavity 20 defined by the fin 10.

In general, data acquired by a gyroscope 72, accelerometer 76, compass 74, and/or GPS 70 during a ride on a watercraft may be sent to and processed by a microcontroller 82 and transmitted wirelessly to another location for access by a user or rider. Alternatively, data acquired by a gyroscope 72, accelerometer 76, compass 74, and/or GPS 70 during a ride on a watercraft may be sent to and processed by a microcontroller 82 and stored on a local data storage device 78 in the cavity 20 defined by the fin 10, as shown in FIG. 9.

In general, a microcontroller 82 is a small computer on a single integrated circuit containing a processor core, memory, and programmable input/output peripherals. In general, a microcontroller 82 may receive and interpret data acquired by a gyroscope 72, accelerometer 76, compass 74, and/or GPS 70 during a ride on a watercraft. In some embodiments, microcontrollers 82 available from PJRC.com, LLC, Atmel Corporation®, Arduino®, Texas Instruments Incorporated®, or STMicroelectronics® may be used in the ride tracking device 30 in the cavity 20 defined by the fin 10. Alternatively, in some embodiments, custom microcontrollers 82 may be incorporated into the ride tracking device 30 in the cavity 20 defined by the fin 10.

In general, a data storage device 78 is a device for recording and storing data. In some embodiments, a data storage device may store data obtained during a ride on a watercraft. In some embodiments, the data may be motion, velocity, distance, altitude, orientation, rotation, and location data collected by a gyroscope, accelerometer, compass, and/or GPS during a ride on a watercraft and processed by a microcontroller. In some embodiments, the storage device may be a removable storage device or a mounted storage device. As shown in FIG. 9, in some embodiments, the data storage device 78 may include a secure digital card or a flash drive. In some embodiments, a user or rider may access the ride tracking device 30 in the fin, retrieve the data storage device 78, and transform the data from the ride on the watercraft. In some embodiments, as described above, data collected on the data storage device 78 may be transmitted wirelessly to another location, such that the user does not need access to the ride tracking device. In some embodiments, a flash drive used in the ride tracking device 30 in a fin 10 may be acquired from SanDisk®, Kingston Technology Corporation®, PNY Technologies Incorporated®, or Silicon Power Computer & Communications Incorporated®. In some embodiments, a secure digital card used in the ride tracking device 30 in a fin 10 may be acquired from SparkFun Electronics®, SanDisk®, Sony Electronics Incorporated®, or Transcend Information Incorporated®. Alternatively, in some embodiments, a custom data storage device 78 may be incorporated into the ride tracking device 30 in the cavity 20 defined by the fin 10.

In general, the ride tracking device 30 in the cavity 20 defined by the fin 10 may be powered by a power source 80. In general, the power source may power the gyroscope, accelerometer, compass, GPS, microcontroller, and/or data storage device required for sensing, acquiring, processing, storing, and exporting data acquired during a ride on a watercraft. In general, the power source may be internal (i.e. in the cavity defined by the fin) or external. In some embodiments, as shown in FIG. 9, the internal power source may be a battery. In some embodiments, the battery may be a lithium polymer battery cell or any other type of battery adapted to power a microcontroller, gyroscope, accelerometer, compass, GPS, and/or data storage device. In some embodiments, an external power source may couple to a power charging port 84 on the ride tracking device 30. In some embodiments, an external power source may be one or more solar panels or a propeller or similar device for harvesting hydroelectricity coupled to an exterior surface of the fin. In some embodiments, the ride tracking device may be charged by an inductive source, for example a wireless charging pad.

In some embodiments, a user or rider may transform the data collected during a ride on a watercraft by the microcontroller and stored on the data storage device. In some embodiments, a user or rider may access the data, for example motion, orientation, location, rotation, velocity, altitude, and distance data, from a ride, export the data to an application, and manipulate the data in the application. In some embodiments, a user or rider may use a custom application to generate statistics about his/her ride on the watercraft. In some embodiments, a user or rider may generate graphs, charts, presentations, or other materials using the data collected by the ride tracking device during a ride on a watercraft. In some embodiments, a user or rider may generate a map of the world or a portion thereof illustrating all of the locations in which the surfer has surfed, for example illustrating all of the beaches on which the surfer has ridden a wave. In some embodiments, a user or rider may use a custom application to generate artwork based on the data collected from his/her ride on a watercraft. In some embodiments, the artwork may include visual artwork, such as various colored shapes or contours outlining the movement of the watercraft during a ride. In some embodiments, the artwork may include audible artwork, such as acoustic music, electric music, or music containing words. In some embodiments, a user or rider may socially share the data, for example on social networks such as Facebook®, Pinterest®, or Instagram®, or using a custom application.

In some embodiments, two or more fins each including a ride tracking device within the cavity defined by the fin may be used in a surf competition, tournament, and/or championship. The plurality of ride tracking devices may each be used during a period of time at a location or may each be used at different times and locations. In some embodiments, each rider or surfer would have a surfboard with a fin comprising a ride tracking device within the cavity defined by the fin. In some embodiments, the data collected by the ride tracking device may be used to determine scores, positions, and/or placement of surfers and/or riders in the competition. In some embodiments, all the data from all of the different fins would be transmitted wirelessly to a common location. In some embodiments, the data may be updated consistently throughout the tournament. In some embodiments, the data may be published to a physical or virtual board, a television network, a website, an application, and/or a mobile device for interested parties to track the progression and/or outcome of the competition. In some embodiments, the data collected may be public domain. Alternatively, in some embodiments, access to the data may be proprietary or limited to interested parties having a password, subscription, and/or privileged access.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A watercraft system comprising:
    a planar body configured for moving across a water surface and for carrying a rider;
    at least one fin coupled to a bottom portion of the planar body, wherein the fin defines a fully enclosed cavity; and
    a ride tracking device disposed within the cavity,
    wherein the fin comprises a base with a slot configured for receiving the ride tracking device, and
    wherein the cavity becomes watertight by coupling the base of the fin to the bottom portion of the planar body.

2. The watercraft system of claim 1, wherein the planar body is a surfboard.

3. The watercraft apparatus of claim 1, wherein the ride tracking device further comprises at least one of a power cable port and data transfer cable port.

4. The watercraft system of claim 1, wherein the ride tracking device is configured to collect data about a ride on the planar body.

5. The watercraft system of claim 4, wherein the ride tracking device is configured to collect data comprising at least one of duration of a ride, velocity, movement, and location.

6. The watercraft system of claim 4, wherein the ride tracking device comprises at least one of a gyroscope, accelerometer, compass, global positioning device, and device comprising a combination thereof.

7. The watercraft system of claim 4, wherein the data are wirelessly transmitted to another location.

8. The watercraft system of claim 4, wherein the data are transformed into an artistic representation of the ride.

9. A watercraft system comprising:
    at least one fin coupleable to a bottom portion of a planar body, wherein the fin defines a cavity, and the cavity is accessible by a user; and
    a ride tracking device disposed within the cavity, wherein the cavity comprises opposing concave grooves configured to receive and hold the ride tracking device.

10. The watercraft system of claim 9, wherein the ride tracking device is configured to collect data about a ride on the planar body.

11. The watercraft system of claim 10, wherein the ride tracking device is configured to collect data comprising at least one of duration of a ride, velocity, movement, and location.

12. The watercraft system of claim 10, wherein the ride tracking device comprises at least one of a gyroscope, accelerometer, compass, global positioning device, and device comprising a combination thereof.

13. The watercraft system of claim 10, wherein the data are wirelessly transmitted to another location.

14. The watercraft system of claim 10, wherein the data are transformed into an artistic representation of the ride.

15. The watercraft system of claim 9, wherein the ride tracking device is one of watertight and waterproof.

16. The watercraft system of claim 9, wherein the ride tracking device is powered by hydroelectricity.

17. The watercraft system of claim 12, wherein the ride tracking device further comprises a storage device, and wherein the data are stored in the fin on the storage device.

18. A watercraft system comprising:
    at least one fin coupleable to a bottom portion of a planar body, wherein the fin defines a cavity, and the cavity is accessible by a user; and
    a ride tracking device disposed within the cavity, wherein the cavity has a substantially rectangular shape and is configured to receive and hold the ride tracking device.

* * * * *